(12) United States Patent
Rass et al.

(10) Patent No.: US 6,367,683 B1
(45) Date of Patent: Apr. 9, 2002

(54) SOLDER BRAZE ALLOY

(75) Inventors: Ino J. Rass; Erich Lugscheider, both of Aachen; Frank Hillen, Hückelhoven, all of (DE)

(73) Assignee: Materials Resources International, North Wales, PA (US)

( * ) Notice: Subject to any disclaimer, the term of this patent is extended or adjusted under 35 U.S.C. 154(b) by 0 days.

(21) Appl. No.: 09/462,577

(22) PCT Filed: Jul. 10, 1998

(86) PCT No.: PCT/EP98/04309

§ 371 Date: Mar. 9, 2000

§ 102(e) Date: Mar. 9, 2000

(87) PCT Pub. No.: WO99/02299

PCT Pub. Date: Jan. 21, 1999

(30) Foreign Application Priority Data

Jul. 10, 1997 (DE) .......................... 197 29 545

(51) Int. Cl.⁷ .................. C22C 18/00; C22C 28/00; C22C 12/00
(52) U.S. Cl. ................. 228/121; 228/111.5; 228/262.1; 420/513; 420/555; 420/577
(58) Field of Search .............................. 228/124.5, 121, 228/262.1; 420/580, 513, 533, 577

(56) References Cited

U.S. PATENT DOCUMENTS

| | | | | |
|---|---|---|---|---|
| 4,040,822 A | * | 8/1977 | Stern ........................... | 75/140 |
| 4,106,930 A | * | 8/1978 | Nomaki et al. ................ | 75/134 |
| 4,643,875 A | | 2/1987 | Mizuhara | |
| 4,797,328 A | * | 1/1989 | Boehm et al. .............. | 428/621 |
| 5,286,441 A | * | 2/1994 | Shibata ........................ | 419/21 |
| 5,435,857 A | * | 7/1995 | Han et al. ..................... | 148/24 |
| 5,447,683 A | * | 9/1995 | Montgomery et al. ....... | 420/117 |
| 5,527,628 A | * | 6/1996 | Anderson et al. ........... | 428/647 |
| 5,690,890 A | * | 11/1997 | Kawashima et al. ......... | 420/559 |
| 6,047,876 A | * | 4/2000 | Smith ..................... | 228/111.5 |
| 6,231,693 B1 | * | 5/2001 | Lugscheider et al. ........ | 148/442 |

FOREIGN PATENT DOCUMENTS

| | | | | |
|---|---|---|---|---|
| DE | 19526822 | * | 1/1997 | .............. 228/124.5 |
| DE | 195 26 822 | | 1/1997 | |
| EP | 0 235 546 | | 9/1987 | |
| GB | 1 357 073 | | 6/1974 | |
| GB | 1357073 | * | 6/1974 | .............. 228/124.5 |
| GB | 1 385 191 | | 2/1975 | |
| JP | 57127596 | * | 7/1984 | .............. 228/124.5 |
| JP | 59116350 | * | 7/1984 | .............. 228/124.5 |
| WO | WO 97/03789 | * | 2/1997 | .............. 228/124.5 |

OTHER PUBLICATIONS

Humpston, Giles et al., Principles of Soldering and Brazing, 1993, ASM International, pp. 38, 52, 53, 66, 67, and 167.*

* cited by examiner

*Primary Examiner*—Tom Dunn
*Assistant Examiner*—L. Edmondson
(74) *Attorney, Agent, or Firm*—Ratner & Prestia

(57) ABSTRACT

The invention, which permits active solder braze technology to be used in a more versatile manner, relates to a solder braze alloy and to a method for joining workpieces by soldering by means of a solder braze alloy. The novel alloy is characterized in that it comprises 1–10% by weight of an element or a mixture of elements of subgroup IVa and/or Va of the Periodic Table of the Elements and 0.1–20 wt% of an element or a mixture of elements of the group of the rare earths and the remainder consists of zinc, lead, tin, bismuth or indium or a mixture predominantly of two or more of the elements zinc, lead, tin, bismuth and indium and optionally of the elements silver, copper, gallium, antimony, nickel, manganese, chromium, cobalt possibly of customary impurities. The alloy according to the invention can be processed an a solder even in oxygen-containing atmospheres, for example in air, has a relatively low processing temperature and exhibits good wetting even of inherently poorly wettable surfaces such as, for example, ceramic surfaces In a development of the invention the solder braze alloy can be processed without a flux.

19 Claims, No Drawings

SOLDER BRAZE ALLOY

This is the U.S. National Phase of International Application No. PCT/EP98/04309 filed on Jul. 10, 1998.

The invention relates to a solder braze alloy and to a method for adjoining workpieces by soldering by means of a solder braze alloy.

Soldering is one of the most common joining techniques. However, there are still some drawbacks which militate against even more widespread use of soldering for joining workpieces.

Previously known solder braze alloys can be used to good effect only if the surfaces of the workpieces to be joined are cleaned prior to the solder braze being applied and are freed from any oxide layers present, in order to ensure good contact of the solder braze with the workpiece surfraces, and/or if a flux is used together with the solder braze. This means that the workpiece surfaces to be soldered have to undergo a laborious pretreatment and/or that the soldering operation, owing to the use of a flux additive, becomes a more complicated procedure. Furthermore there is the risk that after the soldering operation flux residues will remain on the soldered workpieces, which may lead to problems with further prcessing steps or which may impair the long-term durability of the solder braze joints. Finally, some of the fluxes used constitute health and/or environmental hazards.

Known commercial solder alloys comprising tin and/or lead and possibly silver, which can be processed at about 200° C., have the additional drawback that many materials are not wetted by them at all or only very poorly, and that they cannot be used co join workpieces having surfaces of such poorly wettable or entirely nonwettable materials. Using classic solders of this type it is not possible, for example, to solder workpieces made of ceramic materials, since ceramic surfaces are not wetted.

In earlier attempts to overcome this drawback, titanium was added to the solders. These so-called active solders comprising a percentage of titanium as the so-called active metal exhibit considerably improved wetting even of inherently poorly wettable surfaces such as, for example, ceramic materials. A considerable drawback of these active solders, however, is that they require processing temperatures of from 600 to 900° C. and can be processed only in a high vacuum or in pure shielding gas. The need of processing under vacuum means that the soldering process becomes very laborious; in many cases using them is out of the question. Furthermore, the high processing temperature seriously limits the choice of solderable materials.

This drawback also relates to the classic active brazes which are processed at temperatures of at least 700° C., but in most cases above 850° C.

A further known technique, for certain special cases, is that of eutectic copper bonding, but this is even more laborious and complicated.

DE-A 195 26 822 discloses a solder braze alloy con taining:
- at least 1 wt % of an element or a mixture of elements of subgroup IVa and/or Va such as Ti, Zr, Hf, V, Nb and Ta,
- at least 0,01 wt % of an element or a mixture of elements of the Lanthanide group such as cerium (preferably) and neodymium,
- optionally at least 0,5 wt % silver or copper or indium or a mixture of silver and/or copper and/or indium,
- optionally at least 0,01 wt % gallium,
- and the remainder consists of tin or lead or a mixture of tin and lead,
- and customary unavoidable impurities.

This document does not disclose to provide a remainder consisting or including the element indium. This known solder braze alloy is not sufficient to be used with temperature sensitive material. Additionally, the joining of materials subjected to higher temperatures, for example above 300° C., in use is not possible.

It is therefore an object of the invention to propose a solder braze alloy and a method for joining workpieces by soldering by means of a solder braze alloy, the method allowing soldering technology to be used in a more versatile manner. In particular, it is the object of the invention to propose a solder braze alloy which can be processed even in oxygen-containing atmospheres, for example in air, has a relatively low processing temperature and produces good wetting even on inherently poorly wettable surfaces such as, for example, ceramic surfaces. In a development of the invention, the solder braze alloy to be proposed is to be processable without a flux.

The proposed solder braze alloys are to have liquidus temperatures which, depending on the composition, can be below or above 450° C.

This object is achieved by a novel solder braze alloy and a method for joining workpieces by soldering by means of this novel solder braze alloy.

The novel alloy, which generally is an active solder braze alloy, is characterized in that it comprises
- 1–10 wt % of an element or a mixture of elements. of subgroup IVa and/or Va of the Periodic Table of the elements,
- 0,01–20 wt % of an element or a mixture of elements of the group of the rare earths,
- 0–10 wt % of silver or copper or a mixture of silver and copper,
- 0–50 wt % of antimony
- 0–5% wt % of nickel, cobalt, manganese or chromium or a mixture of two or more of the elements nickel, cobalt, manganese or chromium, and
- 0–10 wt % of gallium and the remainder consists of zinc, bismuth, indium or a mixture of two or more of the elements zinc, lead, tin, bismuth and indium, one of the mixture elements being zinc, bismuth or indium,
- and possibly of customary impurities.

The proposed active solder braze alloy therefore consists of at least three components, namely a first component which consists of an element or a mixture of elements of subgroup IVa and/or Va of the Periodic Table of the Elements; a second component which consists of an element or a mixture of elements of the group of the rare earths; and of a third component making up the remainder, which predominantly consists of zinc, lead, tin, bismuth or indium or a mixture of two or more of the elements zinc, lead, tin, bismuth and indium.

Preferably, the alloy according to the invention, which can be an active solder alloy or an active braze alloy, additionally comprises a further, fourth component which consists of silver or copper or a mixture of silver and copper; and/or another further, fifth component which consists of gallium. A sixth component of antimony and a seventh component of nickel, manganese, chromium or cobalt can advantageously likewise be provided. The fourth and possibly fifth, sixth, seventh components are advantageously present in the novel alloy, but are not absolutely necessary to achieve the advantages of the invention.

The elements of subgroup IVa and/or Va of the Periodic Table of the Elements include, inter alia, the elements titanium, zirconium, hafnium, vanadium, niobium and tantalum, among which titanium is preferred. The elements of the rare earths include, inter alia, cerium, praseodymium, neodymium, gadolinium and ytterbium, among which cerium is preferred. A mixture of elements of the rare earths, cerium being the main component, is likewise preferred as the second component.

The function of the individual active solder braze alloy components can be described as follows:

The third component making up the remainder and comprising zinc, lead, tin, bismuth or indium or a mixture of two or more of the elements zinc, lead, tin, bismuth and indium serves to set a suitable fusion temperature.

The first component, which consists of an element or a mixture of elements of subgroup IVa and/or Va of the Periodic Table of the Elements—in particular of titanium—increases the wetting power of the alloy, especially for ceramic surfaces. It further serves to reduce the surface tension of the alloy in the fused state.

The second component, which consists of an element or of a mixture of elements of the group of the rare earths, in particular cerium, prevents, owing to its high affinity to oxygen, the oxidation of the first component which in particular consists of titanium. Owing to the high affinity to oxygen, oxygen from the surroundings, from oxide layers of the materials to be joined or from other sources preferably binds to the cerium but not to the titanium, so that the titanium is preserved, at least largely, in the nonoxidized form and is able to deploy its positive effects.

Alloys of the composition according to the invention can be used to join a multiplicity of metallic and nonmetallic materials, including oxidic and nonoxidic ceramic materials, to themselves or to other materials. The solder joint can advantageously be effected in an oxygen-containing atmosphere, for example in air. Furthermore, in general there is no need to use a flux.

The liquidus temperature of the solder braze alloy according to the invention, depending on the composition, is below or above 450° C. The processing temperatures are between 120 and 550° C.

In contrast to the known active solder brazes, the processing temperatures of an alloy according to the invention are therefore drastically lower. Furthermore, there is no need for a vacuum or a shielding-gas atmosphere for carrying out the soldering operation.

The joining mechanism is based on:

the removal, by reactive alloy components, of any oxide coatings present on the surfaces of the workpieces to be joined;

the reduction of the surface tension in the fused state owing to interactions of the alloy components with the ambient media and bonding via physical forces.

Active solder braze alloys according to the invention can be used to good effect in a wide variety of fields under a wide variety of processing conditions. They can be used, for example, for soldering copper to steel or cast iron-carbon alloys without any difficulty. They also allow copper to be soldered onto silicon workpieces—for example, a semiconductor wafer. For alloys according to the invention this means numerous applications in semiconductor electronics, both in microelectronics and in the field of power electronics.

In addition to the option of soldering, for example, a copper sheet onto a silicon wafer it also becomes possible e.g. to solder a workpiece made of copper to a workpiece made of aluminium nitride. Aluminium nitride is a good insulator, whose insulating characteristics are comparable to those of the common insulator aluminium oxide, but which has a distinctly higher thermal conductivity than aluminium oxide. The solder braze alloy according to the invention can therefore be used to establish a joint having very good thermal conductivity between a power semiconductor and an aluminium nitride workpiece which dissipates the lost heat of the power semiconductor element into a base, the aluminium nitride workpiece however ensuring electrical insulation with respect to the base.

Another possible approach, for example, is that of using an alloy according to the invention for soldering a copper sheet onto a base body made of silicon, aluminium nitride or fibre-reinforced carbon. Then further metallic components can be soldered onto this copper sheet in a known manner, using known, commercial solder brazes.

An alloy solder braze according to the invention can also be used to solder aluminium workpieces to one another or to copper or steel components or components made of cast iron-carbon alloys such as cast iron or cast steel. This can advantageously be employed in plumbing technology, e.g. for joining components when condensers or heat exchangers are being built or repaired, or for attaching, by means of a joint having good thermal conductivity, of temperature sensors to heating and hot-water systems.

Solder braze alloys according to the invention can be prepared and used in a very wide variety of embodiments, for example as wires, rods, sheets, granular materials, powders, pastes, foils or shaped parts. Solder pastes are known as so-called metallization solder pastes, thick-layer solder pastes, thick-film solder pastes or screen-printing solder pastes and can be applied to printed circuits by screen-printing.

Heating of an alloy according to the invention can suitably be effected by all known heating methods, for example heating by means of soldering iron or flame, plate heating, hot-air heating, ultrasonic heating, resistance heating or induction heating. Solder braze alloys according to the invention can also be used in the reflow or flows-oldering method.

The liquidus and solidus temperature and consequently the soldering temperature can be influenced by the addition of the further component(s) silver, copper, gallium, antimony, nickel, manganese, chromium, cobalt, which according to the invention can optionally be employed in addition. It is possible for optionally 0.5–10 wt % of silver or copper or a mixture of silver and copper, optionally 0.01–10 wt % of gallium, optionally 0.5–50 wt % of antimony and optionally 0.1–5 wt % of nickel, manganese, chromium, cobalt to be present.

The function of the further components which according to the invention can be employed in addition can be described as follows:

An addition of silver ensures a lowering of the surface tension in the fused state, a decrease in the soldering temperature and an increase of the strength of the finished solder joint.

An addition of copper serves to increase the soldering temperature, to improve the wetting behaviour especially with respect to ferrous materials and to increase the strength of the finished solder joint.

An addition of gallium results in improved removal of oxide layers and a reduction of the soldering temperature.

Advantageously, the alloy also comprises antimony and iron, nickel, cobalt, manganese and chromium.

In this context, the elements iron, nickel, manganese and chromium preferably likewise serve to adjust the fusion temperature and also to increase wettability, whilst cobalt additionally allows grain refinement to occur.

The element antimony is used in a preferred embodiment, specifically to regulate the soldering temperature and to increase the strength of the solder joint.

An essential feature, however, is the use of zinc, lead, tin, bismuth or indium or a mixture of two or more of the elements zinc, lead, tin, bismuth and indium, since this results in an increase of the strength and the fusion temperature of the alloy.

Further advantageous refinements of the invention are the subject of the dependent claims.

As stated, solder braze alloys according to the invention have a number of important advantages compared with the prior art. The most important point to be mentioned is that solder braze alloys according to the invention can be processed in all ambient atmospheres even without a flux, that they have relatively low processing temperature and can be used even with inherently very poorly wettable surfaces. In addition to those applications where solder joints are used even today for joining workpieces together, they will find an advantageous potential use even in many areas where glued joints have hitherto been used for joining.

The solder braze alloy according to the invention and the method according to the invention will be described below in more detail with reference to a working example.

In the domestic-appliance sector, an alloy consisting of 4 wt % of Ti, 4 wt% of Ag, 0.1 wt % of cerium, 0.1 wt % of Ga, the remainder being zinc, is particularly advantageous. With this alloy the fusion temperature is then in the range of from about 421 to 446° C.

As well as the soldering technique described, all other soldering techniques known to those skilled in the art can be carried out with an active solder braze alloy according to the invention. Any optimization, in terms of the specifically intended use, within the scope of the claims can readily be found experimentally by those skilled in the art.

What is claimed is:

1. A solder braze alloy comprising:
   0–10 wt % of an element or a mixture of elements selected from the group consisting of titanium, zirconium, hafnium, vanadium, niobium, and tantalum,
   0.01–20 wt % of an element or a mixture of elements of the group of the rare earths,
   0–10 wt % of an element or a mixture of elements selected from the group consisting of silver and copper,
   0–50 wt % of antimony,
   0–5 wt % of an element or a mixture of elements selected from the group consisting of nickel, cobalt, manganese, and chromium,
   0–50 wt % of indium,
   0.01–10 wt % of gaium, and
   a remainder consisting of at least 30 wt % zinc, bismuth, or a mixture of those two elements.

2. The alloy according to claim 1 wherein the element or the mixture of elements selected from the group consisting of titanium, zirconium, hafnium, vanadium, niobium, and tantalum comprises at least 1 wt % of the alloy.

3. A solder braze alloy comprising:
   1–10 wt % of titanium,
   0.01–20 wt % of an element or a mixture of elements of the group of the rare earths,
   0–10 wt % of an element or a mixture of elements selected from the group consisting of silver and copper,
   0–10 wt % of antimony, 0–5 wt % of an element or a mixture of elements selected from the group consisting of nickel, cobalt, manganese, and chromium,
   0–50 wt % of indium,
   0–50 wt % of lead,
   0–50 wt % of tin,
   0.01–10 wt % of gallium, and
   a remainder consisting of at least 30 wt % zinc, bismuth, or a mixture of those two elements.

4. The alloy according to claim 2 wherein the alloy comprises up to 5% by weight of the element or mixture of elements selected from the group consisting of titanium, zirconium, hafnium, vanadium, niobium, and tantalum.

5. The alloy according to claim 1 wherein the element or the mixture of elements of the group of the rare earths is or comprises at least one of cerium, samarium, and neodymium.

6. The alloy according to claim 5, wherein the element is cerium.

7. The alloy according to claim 1 wherein the alloy comprises 0.5–10% by weight of the element or the mixture of elements selected from the group consisting of silver and copper.

8. The alloy according to claim 7, wherein the alloy comprises 0.5–5% by weight of the element or the mixture of elements selected from the group consisting of silver and copper.

9. The alloy according to claim 1 wherein the alloy comprises 0.5–50% by weight of antimony.

10. The alloy according to claim 1 wherein the alloy comprises 0.1–5% by weight of the element or the mixture of elements selected from the group consisting of nickel, cobalt, manganese, and chromium.

11. A solder braze alloy comprising:
    4 wt % of titanium;
    4 wt % of silver;
    0.1 wt % of cerium;
    0–50 wt % of antimony;
    0–5 wt % of an element or a mixture of elements selected from the group consisting of nickel, cobalt, manganese, and chromium;
    0.1 wt % of gallium; and
    the remainder being zinc.

12. A method for joining workpieces by soldering, the method comprising the steps of:
    providing a solder braze alloy comprising 0–10 wt % of an element or a mixture of elements selected from the group consisting of titanium, zirconium, hafnium, vanadium, niobium, and tantalum, 0.01–20 wt % of an element or a mixture of elements of the group of the rare earths, 0–10 wt % of an element or a mixture of elements selected from the group consisting of silver and copper, 0–50 wt % of antimony, 0–5 wt % of an element or a mixture of elements selected from the group consisting of nickel, cobalt, manganese, and chromium, 0.01–10 wt % of gallium, 0–50 wt % of lead, 0–50 wt % of tin, 0–50 wt % of indium, and a remainder consisting of zinc, bismuth, or a mixture of those two elements; and
    forming a solder joint in an oxygen-containing atmosphere at a soldering temperature of between 120 and 550° C.

13. The method according to claim 12 wherein the solder joint is formed at a soldering temperature of 200–450° C.

14. The method according to claim 12 wherein the solder joint is formed without the use of a flux.

15. The method according to claim 12 wherein the solder joint surface of at least one of the workpieces to be joined is a metallic material.

16. The method according to claim 12 wherein the solder joint surface of at least one of the workpieces to be joined is a nonmetallic material.

17. A method for joining workpieces by soldering, the method comprising the steps of:

providing a solder braze alloy comprising 1–10 wt % of an element or a mixture of elements selected from the group consisting of titanium, zirconium, hafnium, vanadium, niobium, and tantalum, 0.01–20 wt % of an element or a mixture of elements of the group of the rare earths, 0–10 wt % of an element or a mixture of elements selected from the group consisting of silver and copper, 0–50 wt % of antimony, 0–5 wt % of an element or a mixture of elements selected from the group consisting of nickel, cobalt, manganese, and chromium, 0–10 wt % of gallium, 0–50 wt % of lead, 0–50 wt % of tin, 0–50 wt % of indium, and a remainder consisting of zinc, bismuth, or a mixture of those two elements; and forming a solder joint in an oxygen-containing atmosphere at a soldering temperature of 421–446° C.

18. The method according to claim 15 wherein the metallic material is selected from the group consisting of aluminum, copper, steel, and cast iron-carbon alloys.

19. The method according to claim 16, wherein the nonmetallic material is selected from the group consisting of nitride, silicon, fiber-reinforced carbon, and ceramic.

* * * * *

UNITED STATES PATENT AND TRADEMARK OFFICE
CERTIFICATE OF CORRECTION

PATENT NO.         : 6,367,683 B1
APPLICATION NO. : 09/462577
DATED               : April 9, 2002
INVENTOR(S)       : Ino J. Rass et al.

It is certified that error appears in the above-identified patent and that said Letters Patent is hereby corrected as shown below:

On the Title Page, Item -56-, References Cited
U.S. PATENT DOCUMENTS, insert

--3,949,118    4/1976    Nagano et al.    427/57
      5,372,298    12/1994   Glaeser         228/195--

On the Title Page, Item -56-, References Cited
FOREIGN PATENT DOCUMENTS, delete

"195 26 822    1/1997
     1 357 073     6/1974"

On the Title Page, Item -57-, ABSTRACT, line 15, delete "an" and insert --as--.

In column 1, line 32, delete "co" and insert --to--.

In column 1, line 56, insert a hyphen after the word "con".

In column 1, line 62, delete "0,01" and insert --0.01--.

In column 1, line 65, delete "0,5" and insert --0.5--.

In column 1, line 67, delete "0,01" and insert --0.01--.

In column 2, line 4, delete "to provide" and insert --providing--.

In column 2, line 32, delete "0,01" and insert --0.01--.

In column 4, line 39, delete "flows-oldering" and insert --flow-soldering--.

In claim 1, column 5, line 56, delete "gaium" and insert --gallium--.

In claim 3, column 6, line 3, delete "0-10" and insert --0-50--.

UNITED STATES PATENT AND TRADEMARK OFFICE
CERTIFICATE OF CORRECTION

PATENT NO. : 6,367,683 B1
APPLICATION NO. : 09/462577
DATED : April 9, 2002
INVENTOR(S) : Ino J. Rass et al.

It is certified that error appears in the above-identified patent and that said Letters Patent is hereby corrected as shown below:

In claim 3, column 6, line 3, after "antimony," insert a new paragraph.

Signed and Sealed this

Twenty-fourth Day of July, 2007

JON W. DUDAS
*Director of the United States Patent and Trademark Office*